United States Patent [19]

Schrunk

[11] 4,223,499

[45] Sep. 23, 1980

[54] DECORATIVE STAINED GLASS INSERT UNIT FOR WINDOWS

[76] Inventor: Thomas R. Schrunk, 2306 NE. Garfield, Minneapolis, Minn. 55418

[21] Appl. No.: 11,187

[22] Filed: Feb. 12, 1979

[51] Int. Cl.[2] ......................... E04C 1/42; C03C 27/08

[52] U.S. Cl. ........................................ 52/308; 52/314; 52/475; 52/656; 49/401; 428/38

[58] Field of Search .......................... 49/401; 248/208; 52/211, 311, 456, 306, 307, 308, 314, 475, 656; 428/38

[56] References Cited

U.S. PATENT DOCUMENTS

| | | | |
|---|---|---|---|
| 2,991,213 | 7/1961 | Williams | 428/38 X |
| 3,190,411 | 6/1965 | Pasche | 49/401 |
| 3,226,903 | 1/1966 | Lillethun | 52/172 |
| 3,460,303 | 8/1969 | Algrain et al. | 52/308 |
| 3,512,320 | 5/1970 | Ferron et al. | 428/38 X |
| 3,621,631 | 11/1971 | Cutler | 52/311 X |
| 3,676,920 | 7/1972 | Pilditch | 428/38 X |

*Primary Examiner*—George F. Lesmes
*Assistant Examiner*—R. Eugene Varndell, Jr.
*Attorney, Agent, or Firm*—Wayne B. Easton

[57] ABSTRACT

The invention relates to a decorative stained glass insert unit which is attachable to an existing window unit to create an esthetically pleasing window treatment effect.

1 Claim, 4 Drawing Figures

DECORATIVE STAINED GLASS INSERT UNIT FOR WINDOWS

The invention relates to a decorative stained glass insert unit which is attachable to an existing window unit to create an esthetically pleasing window treatment effect.

A main object of the invention is to provide a new and improved window insert unit of the kind referred to above.

Other objects and advantages will become apparent from the following specification, appended claims and attached drawings.

Figure 1:
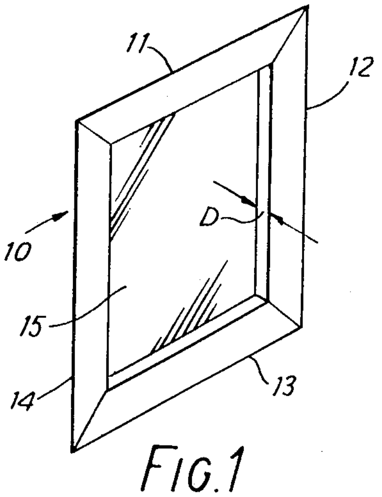
FIG. 1 is a perspective view of a common or ordinary window unit of the type to which a decorative stained glass insert unit embodying the invention may be applied.

In the drawings, FIG. 1 shows a common window unit 10 viewed from the inside of the building in which it is installed. The window unit has frame members 11 to 14 and a pane of glass 15. The pane of glass is recessed a distance D relative to the inner, flat surfaces of the frame members 11 to 14.

The decorative glass insert unit described hereafter will be referred to for convenience as merely the "insert unit".

Figure 2:
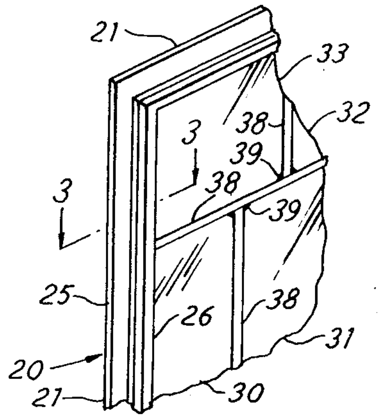
FIG. 2 is a fragmentary perspective view of a decorative stained glass insert unit embodying the invention.

The insert unit 20 as shown in FIG. 2 is viewed from its outer side. The insert unit has four extruded aluminum frame elements 21 joined as indicated in FIG. 2 to form the four sides of the insert. Common or ordinary means may be used for joining the four elements 21 but such means are not shown herein. Each frame element 21 includes a flange 25 and a stained glass retainer 26. When the insert unit is assembled the flanges 25 are attachable with screws or the like to the window frame members 11 to 14 with the retainers 26 being on the side thereof adjacent the glass pane 15. The outer perimeter or shape of the four retainers 26 must be dimensioned so as to be smaller than the inner perimeter or shape defined by the window frame member 11 to 14 to allow a nested position for the insert unit. As the insert unit is mounted with the retainers 26 on the far side as viewed from the inside, the width of the retainer must be less than the recess distance D.

The glazing section of insert unit 20 usually comprises two or more quarries or panes of stained glass of different colors and these are illustrated by way of example in FIG. 2 as panes 30, 31, 32 and 33. The glazing section is fabricated as a unit prior to the attachment of the frame elements 21. The panes 30 to 33 are assembled and joined as a glazing section or unit with came sections 38 which are grooved rods of case lead joined with soldered joints 39.

Figure 3:
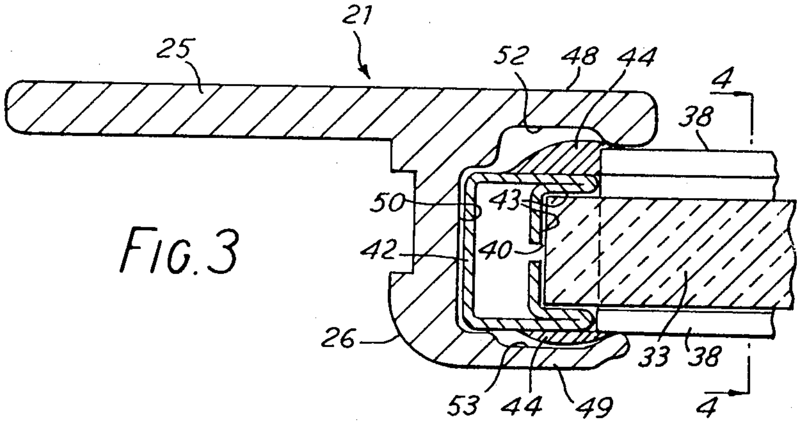
FIG. 3 is a sectional view taken on line 3—3 of FIG. 2.
Figure 4:
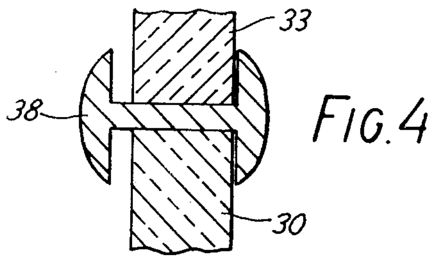
FIG. 4 is a sectional view taken on line 4—4 of FIG. 3.

Referring to FIG. 3, it may be noted that the end of came section 38 thereshown is spaced a short distance from the outer edge 40 of the pane 33. In all instances came sections are foreshortened in this manner to allow the attachment of zinc framing elements 42 having generally hollow, box shaped sections. The inner side of each framing element 42 is recessed to form a channel 43 having the same nominal width as the stained glass panes such as the pane 33 fits into the channel 43 as shown and the depth of the channel is equal to the space between the glass edge 40 and the end of the came section 38.

In fabricating the glazing section the zinc frame elements 42 are soldered to the adjacent ends of the came sections 38 to form soldered joints 44. With this construction a fabricated glazing section comprises panes 30 to 33, came section 38, zince framing element 42 and the soldered joints 39 and 44 referred to above.

A fabricated glazing section as described is framed by the four elements 21 to form the decorative stained glass insert unit 20. Each retainer 26 is formed with side walls 48 and 49 which form a generally rectangularly shaped channel 50 for receiving the glazing section framing elements 42. The retainer side walls 48 and 49 are formed with recesses 52 and 53 to form solder wells for accommodating the soldered joints 44. As mentioned above, the four framing elements 42 are joined together after being mounted on the glazing section to form the completed insert unit 20 by any convenient means such as screws or clips or the like, such means not being shown herein, however.

The insert unit 20 is then mounted on the window unit 10 by attaching the flanges 25 to the window frame members 11 to 14 with screws (not shown) or the like. The retainer wall 48 of each retainer 26 is towards the inside of the building and is the wall closest to and seen by a viewer on the inside of the building. Wall 48 is made wider than wall 49, as may be best seen in FIG. 3, so as to hide or make the wall 49 or the edge thereof obscure to the viewer. This is of importance because light shining in from the outside of the window outlines the edges of the walls 49 and these edges would be conspicuous to the viewer if the rectangular shape formed by the edges of the walls 49 was the same size or smaller than the corresponding rectangular shape formed by the edges of the walls 48. 9n

What I claim is:

1. A window and a stained glass insert assembly, comprising, a decorative stained glass insert unit, a window unit having rectangularly shaped glass pane means and surrounding frame means on the inner side thereof, said pane means being recessed a predetermined distance relative to said frame means to accomodate the protruding therein of said stained glass insert unit, said stained glass insert unit including at least two panes of stained glass arranged to form a rectangularly shaped border, leaded came sections joining said panes, said came sections having ends spaced a short distance from said border, said insert unit including four zinc framing elements having generally hollow box shaped sections with the inner side of each said framing element being recessed a distance equal to said short distance for receiving the border edges of said panes, means joining said zinc framing elements, soldered joints for joining said came sections to each other and said zinc framing elements, said insert unit including four aluminum frame elements each having a flange section for attachment to said window unit frame means and a retainer section with first and second spaced apart walls forming a channel for receiving one of said zinc framing elements, said walls being respectively recessed on the inner sides thereof to form solder wells to accommodate said soldered joints between said glazing section frame elements and said came sections, said first wall being in the plane of said flange and said second wall being adjacent said window unit pane means, said first wall being wider than said second wall to make the edge of said second wall inconspicuous to a view from the flange side of said frame elements, and means joining said aluminum frame elements.

* * * * *